(12) United States Patent
Sierad et al.

(10) Patent No.: US 8,840,150 B2
(45) Date of Patent: Sep. 23, 2014

(54) MALE FITTING WITH ACTUATING RETAINING FEATURE

(71) Applicants: Leslie Sierad, Central, SC (US); Samuel G. Rankin, Mountain Rest, SC (US); Dan Simionescu, Pendleton, SC (US)

(72) Inventors: Leslie Sierad, Central, SC (US); Samuel G. Rankin, Mountain Rest, SC (US); Dan Simionescu, Pendleton, SC (US)

( * ) Notice: Subject to any disclaimer, the term of this patent is extended or adjusted under 35 U.S.C. 154(b) by 0 days.

(21) Appl. No.: 13/926,266

(22) Filed: Jun. 25, 2013

(65) Prior Publication Data

US 2013/0341916 A1  Dec. 26, 2013

Related U.S. Application Data

(60) Provisional application No. 61/663,741, filed on Jun. 25, 2012.

(51) Int. Cl.
  *F16L 39/00* (2006.01)
  *F16L 37/084* (2006.01)

(52) U.S. Cl.
  CPC .................... *F16L 37/0841* (2013.01)
  USPC ........................... 285/317; 285/308

(58) Field of Classification Search
  USPC .................... 285/7, 140.1, 308, 317
  See application file for complete search history.

(56) References Cited

U.S. PATENT DOCUMENTS

| 2,146,252 | A | * | 2/1939 | Lars | 285/7 |
|---|---|---|---|---|---|
| 2,516,883 | A | * | 8/1950 | Kelly | 285/7 |
| 2,516,907 | A | * | 8/1950 | Penfold | 285/7 |
| 2,523,770 | A | * | 9/1950 | Marette | 285/7 |
| 2,755,106 | A | * | 7/1956 | Chisholm et al. | 285/7 |
| 2,951,714 | A | * | 9/1960 | Reinhold | 285/7 |
| 4,541,457 | A | * | 9/1985 | Blenkush | 137/614.06 |
| 4,863,201 | A | * | 9/1989 | Carstens | 285/317 |
| 4,941,689 | A | * | 7/1990 | Sjoberg | 285/7 |
| 5,033,777 | A | * | 7/1991 | Blenkush | 285/317 |
| 5,316,041 | A | * | 5/1994 | Ramacier et al. | 137/614.04 |
| 5,494,074 | A | * | 2/1996 | Ramacier et al. | 137/614.04 |
| 5,845,943 | A | * | 12/1998 | Ramacier et al. | 285/12 |
| 5,988,705 | A | | 11/1999 | Norkey | |
| 6,332,773 | B1 | * | 12/2001 | Kuhn | 431/345 |
| 6,840,548 | B2 | * | 1/2005 | Lacroix | 285/308 |
| 7,159,797 | B1 | * | 1/2007 | Lammers | 239/394 |
| 7,434,842 | B2 | * | 10/2008 | Schmidt | 285/91 |
| 7,434,844 | B2 | * | 10/2008 | Kao | 285/317 |
| 7,448,653 | B2 | | 11/2008 | Jensen et al. | |
| 7,458,385 | B2 | | 12/2008 | Martin et al. | |
| 7,472,930 | B2 | * | 1/2009 | Tiberghien et al. | 285/316 |
| 7,753,415 | B2 | * | 7/2010 | Tiberghien et al. | 285/316 |
| 7,802,822 | B2 | * | 9/2010 | Poder et al. | 285/93 |
| 7,828,336 | B2 | * | 11/2010 | Gammons | 285/317 |
| 7,845,684 | B2 | * | 12/2010 | Gaudin | 285/93 |
| 7,878,553 | B2 | | 2/2011 | Wicks et al. | |

(Continued)

*Primary Examiner* — Aaron Dunwoody
(74) *Attorney, Agent, or Firm* — Dority & Manning, PA

(57) ABSTRACT

A male fitting has a body that defines a fluid passage that extends through the body from a first end to a second end. The body may include a first portion adjacent to the first end, a second portion adjacent to the second end and a middle portion separating the first and second portions. The body may further define a slot between the middle portion and the second end. The slot extends at least partially circumferentially around the body. An actuating member may extend at least partially around the body. The actuating member may have at least one stop feature that engages with the body, and a retaining feature that is at least partially aligned with the slot. A spring disposed between the body and the actuating member may exert a force on the actuating member so as to position the retaining feature radially outward from the slot.

20 Claims, 4 Drawing Sheets

(56) References Cited

U.S. PATENT DOCUMENTS

| | | |
|---|---|---|
| 7,887,102 B2* | 2/2011 | Tiberghien et al. ........... 285/317 |
| 2001/0013367 A1 | 8/2001 | Miura et al. |
| 2002/0140228 A1* | 10/2002 | Lacroix et al. ................ 285/317 |
| 2005/0012330 A1* | 1/2005 | Schmidt ........................ 285/317 |
| 2005/0057042 A1* | 3/2005 | Wicks ........................... 285/305 |
| 2009/0284007 A1* | 11/2009 | Schmidt ........................ 285/317 |
| 2011/0210541 A1* | 9/2011 | Lewis et al. ................... 285/317 |
| 2014/0028018 A1* | 1/2014 | Weidman et al. .......... 285/140.1 |

* cited by examiner

MALE FITTING WITH ACTUATING RETAINING FEATURE

FIELD OF THE INVENTION

The present invention generally involves a male fitting with an actuating retaining feature. In particular, the invention relates to a male fitting that is configured to lock into an opening of a receiver body.

BACKGROUND OF THE INVENTION

Conventional bulkhead fittings are routinely used in laboratories and industry to allow repeated separation and attachment of continuous tubing and/or to provide fluid communication through a wall of a container such as a bioreactor, a tank or other vessel. A first end of the bulkhead fitting may be configured to engage with a tube or other fluid conduit so as to provide fluid communication between an external source and the container. A second end of the bulkhead fitting is generally threaded. In particular applications, the wall of the container is tapped so that the bulkhead fitting may be secured by screwing the bulkhead fitting into the tapped portion of the container. However, the wall of the container may be too thin to be tapped, thereby requiring the use of at least one nut and/or washer to secure the fitting to the closed container. In certain instances, such as in a sterile environment, a fluid-tight relation between the container and the bulkhead fitting may be required. As such, a thread sealing tape such as a polytetrafluoroethylene (PTFE) film may be wrapped around the threads of the bulkhead fitting, thereby forming a seal between the bulkhead fitting and the container once the fitting is threaded into the container.

In various applications, the container may be formed from a plastic or some equivalent material. Residual stresses may form in the container walls from the tapping process and/or from the molding or forming processes, thereby resulting in cracking in and around the tapped portion of the container. This cracking may result in excessive leakage around the tapped threads, may allow for contamination to enter the container and/or may compromise the structural integrity of the container. Although the thread sealing tape may be used to reduce the possibility of leakage, the tape itself may also be a source of contamination. In certain instances, the container may include multiple bulkhead fittings connected to multiple tubes that extend outward and around the container, thereby resulting in multiple opportunities for cracking to occur and/or for contamination to breach the container.

In certain instances, it may be necessary to place the container and associated tubing in a space-limited environment. For example, but not limiting of, the container and tubing may be placed in a test oven, a well drilling apparatus, an automobile, an aircraft, or an environmentally controlled apparatus. However, current bulkhead fittings generally extend outward from an outer surface of the container, thereby significantly increasing the footprint and/or volume required within the space-limited environment so as to accommodate the container and associated tubing. In addition, connecting the tubes to each of the bulkhead fittings may be very cumbersome and time consuming due to limited space and/or the need to re-wrap the threads under difficult circumstances such as sterile conditions, where the fitting is out of reach for two hands, etc. Therefore, a non-threaded fitting that reduces mechanical stresses on the container and/or reduces the potential of contamination within the container and/or decreases the difficulty of attaching the fitting to the container would be useful in the art.

BRIEF DESCRIPTION OF THE INVENTION

Aspects and advantages of the invention are set forth below in the following description, or may be obvious from the description, or may be learned through practice of the invention.

One embodiment of the present invention is a male fitting having a body that defines a fluid passage. The fluid passage generally extends through the body from a first end to a second end of the body. The body includes a first portion adjacent to the first end, a second portion adjacent to the second end and a middle portion that separates the first and second portions. The body further defines a first slot between the middle portion and the second end. The first slot extends at least partially circumferentially around the body. The fitting further includes an actuating member that extends at least partially around the body. The actuating member has at least one stop feature that engages with the body, and a retaining feature that is at least partially aligned with the first slot. A spring is disposed between the body and the actuating member. The spring exerts a force on the actuating member so as to position the retaining feature radially outward from the first slot.

Another embodiment of the present invention is a coupling system. The coupling system generally includes a receiver body having an opening. The opening generally extends through the receiver body between an outer wall and an inner wall of the receiver body. The receiver body includes a retaining slot disposed proximate to the opening. The coupling system further includes a male fitting. The male fitting includes a body that defines a fluid passage. The fluid passage extends through the body from a first end to a second end. A first portion of the body is generally adjacent to the first end, a second portion is adjacent to the second end and a middle portion separates the first and second portions. The body further defines a first slot between the middle portion and the second end. The first slot extends at least partially circumferentially around the body. The second portion is complementary to the receiver body opening. An actuating member extends at least partially around the body. The actuating member includes at least one stop feature that engages with the body and a retaining feature that is substantially aligned with the first slot. A spring is disposed between the body and the actuating member. The spring exerts a force on the actuating member so as to position the retaining feature radially outward from the first slot. The second portion of the male fitting is disposed at least partially within the opening of the receiver body. The retaining feature extends at least partially into the retaining slot of the receiver body.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
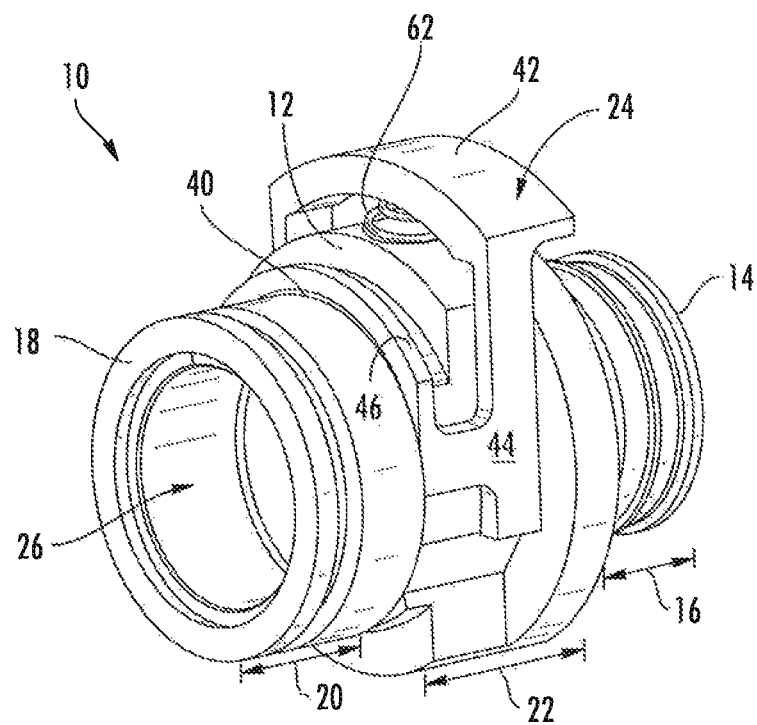
FIG. 1 illustrates a perspective view of a male fitting according to at least one embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention generally include a male fitting having a body that defines a fluid passage that extends from a first end to a second end of the body. The body generally defines a first slot that is generally adjacent to a middle portion of the body, and a second slot such as a seal slot that is position between the first slot and the second end. The first slot may extend at least partially circumferentially around the body. The second slot may extend generally circumferentially around the outer surface of the body. A spring loaded actuating member extends at least partially around the body. The actuating member generally includes at least one stop feature that engages with the body and a retaining feature that is substantially aligned with the second slot. The spring exerts a force on the actuating member so as to position the retaining feature at least partially radially outward from second slot of the body.

In operation, the actuating member of the male fitting may be compressed, thereby allowing the retaining feature to at least partially recess into the first slot. The male fitting may then be inserted into an opening of a receiver body such as a bioreactor that includes a retaining slot that extends generally radially within the opening. The retaining slot may generally align with the retaining feature of the male fitting once the male fitting is seated into the opening. The actuating member may be released, thereby allowing the retaining feature to extend into the retaining slot of the receiver body. As a result, the male fitting may be securely held in position. The male fitting also may be removed by compressing the actuating member, thereby allowing the retaining feature to at least partially recess into the first slot, thus clearing the retaining slot.

Figure 2:
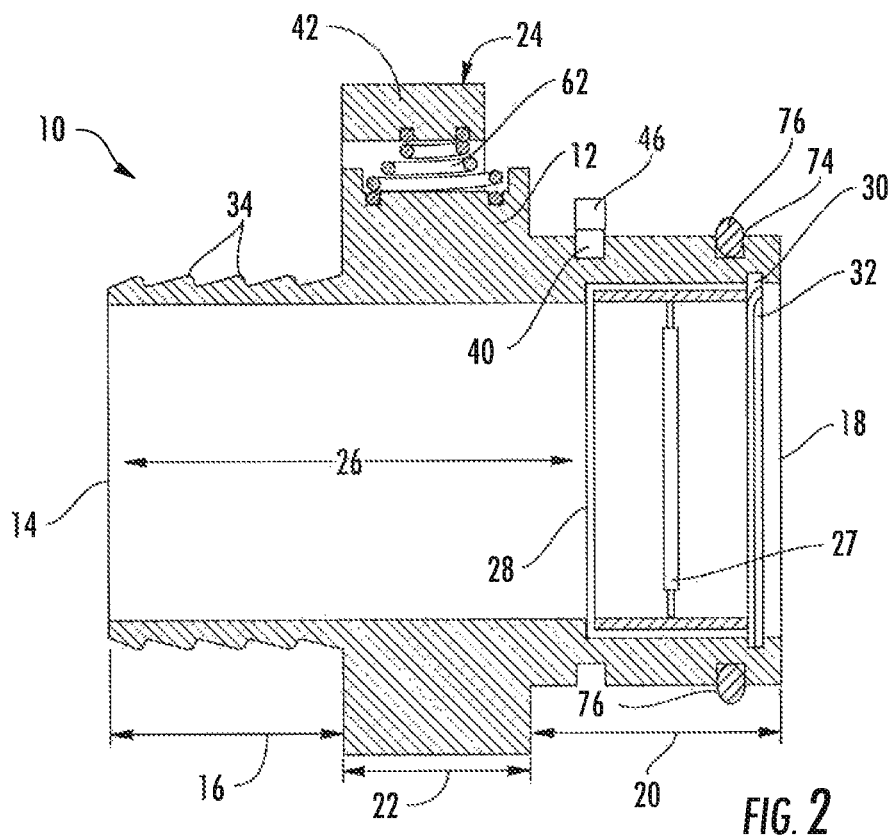
FIG. 2 illustrates a cross section side view of the male fitting as shown in FIG. 1.
Figure 3:
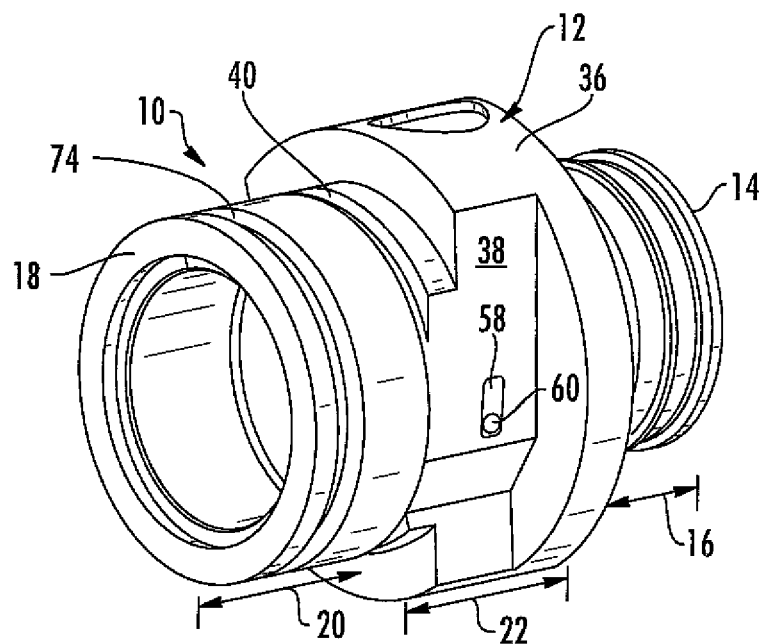
FIG. 3 illustrates a perspective view of a body of the male fitting as shown in FIG. 1.
Figure 4:
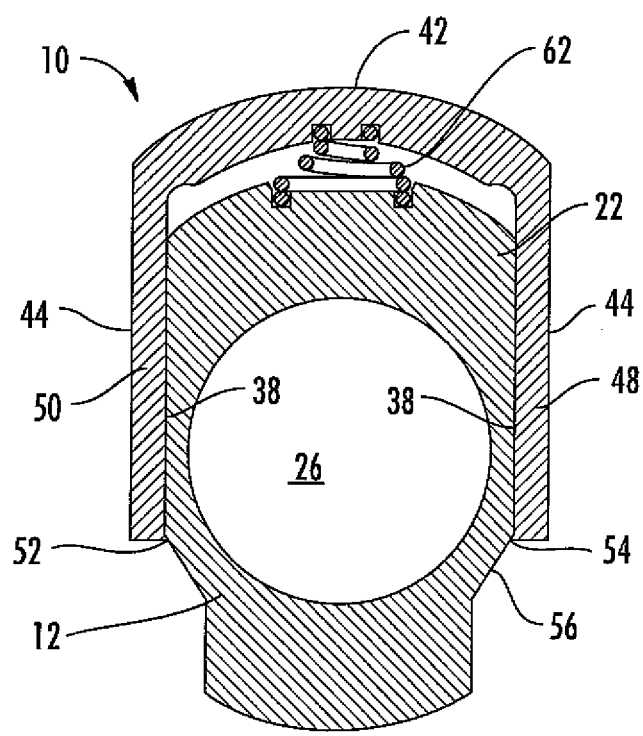
FIG. 4 illustrates a cross section front view of the male fitting as shown in FIG. 1.

FIG. 1 illustrates a perspective view of a male fitting according to at least one embodiment of the present disclosure, FIG. 2 illustrates a cross section side view of the male fitting as shown in FIG. 1, FIG. 3 illustrates a perspective view of a body of the male fitting as shown in FIG. 1 and FIG. 4 provides a cross section front view of the male fitting as shown in FIG. 1. As shown in FIG. 1, a male fitting 10 herein referred to as "the fitting 10" may generally include a body 12 having a first end 14 adjacent to a first portion 16 of the body 12, and a second end 18 adjacent to a second portion 20 of the body 12. The body 12 may further include a middle portion 22 that separates the first portion 16 from the second portion 20. An actuating member 24 at least partially surrounds the middle portion 22 of the body 12.

As shown in FIGS. 1 and 2, the body 12 generally defines a fluid passage 26 that extends through the body 12 from the first end 14 to the second end 18. As shown in FIG. 2, the fluid passage 26 may be configured to receive an insert 27 in at least one end of the body 12. For example, but not limiting of, the diameter of the fluid passage 26 may be stepped (increased or decreased) generally adjacent to the second end 18 of the body 12 so as to form an insert cavity 28. A groove 30 may extend radially within the insert cavity 28 generally adjacent to the second end 18. In addition or in the alternative, the insert cavity 28 and/or the second end 18 may include an alignment feature (not shown) so as to properly seat and/or align the insert 27 into the insert cavity 28. For example, the insert cavity 28 and/or the second end 18 may be keyed.

A retaining member 32 such as a retaining ring or a sealing ring may be inserted into the groove 30 to hold the insert 27 in place. Particular examples of the insert 27 may include but are not limited to a butterfly valve, a ball valve, a check valve, a fluid filter or any type of flow enhancer, flow restrictor or measurement device. The body 12 may be cast, molded, machined from a single piece of material or may be assembled from multiple components. The body 12 may be metal, plastic or any material suitable for the purpose intended for the fitting 10. Although not shown, it should be obvious to one of ordinary skill in the art that the body may have any shape. For example, but not limiting of, the body may be angled so as to form an elbow fitting.

As shown in FIGS. 1 and 2, the first portion 16 of the body 12 may be configured to engage with one or more fluid conduits (not shown) such as flexible tubing or the like. For example, but not limiting of, the body 12 may at least partially define one or more surface features 34 (FIG. 2) such as ribs that extend at least partially around the first portion 16 of the body 12. In this manner, the fluid conduit may slide over the surface features 34 and may be held in position by friction and/or compression forces between the fluid conduit and the surface features 34.

As shown in FIG. 3, the middle portion 22 of the body 12 may include a radial projection 36 that extends at least partially circumferentially around the body 12. In particular embodiments, as shown in FIGS. 3 and 4, the middle portion 22 of the body 12 may define a pair of opposing sides 38. The sides 38 may be tapered, chamfered and/or stepped or any combination thereof. The sides 38 may be generally planer and/or curved and may be generally smooth and/or textured. As shown in FIG. 3, the body 12 may further define a first slot 40 that extends circumferentially around at least a portion of the body 12 between the radial projection 36 and the second end 18.

Figure 5:
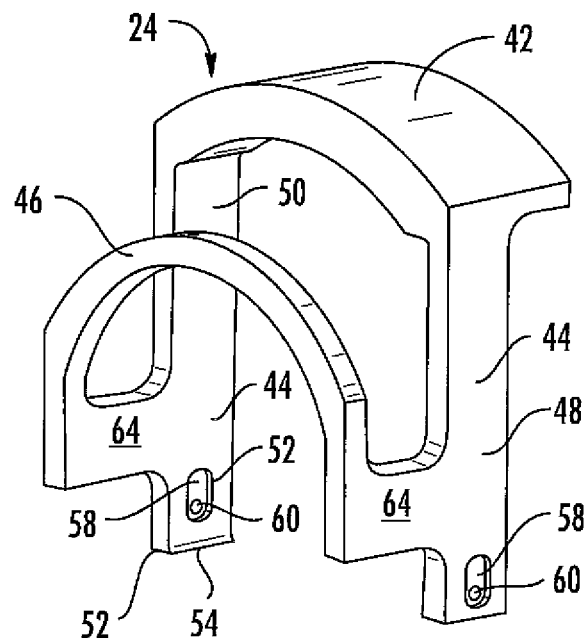
FIG. 5 illustrates a perspective view of an actuating member of the male fitting as shown in FIG. 1.

As shown in FIG. 5, the actuating member 24 may generally include a top 42, at least one side 44 and a retaining feature 46. In particular embodiments, as shown in FIG. 4, the actuating member 24 includes a first side 48 and a second side 50 that are generally aligned with the pair of opposing sides 38 of the middle portion 22 of the main body 12. As shown in FIGS. 4 and 5, at least one stop feature 52 may couple the actuating member 24 to the body 12. Although multiple stop features 52 are illustrated in FIG. 5, it should be understood that the actuating member 24 may include only one of the stop features 52 described herein. For example, as shown in FIG. 4, each or one of the at least one side 44 of the actuating member 24 may include a chamfer 54 that is generally complementary to a chamfer 56 or other feature on the opposing sides 38 of the middle portion 22 of the body 12, thereby retaining the actuating member 24 to the body 12.

In alternate embodiments, as shown in FIG. 5, the stop feature 52 may include at least one slot 58 and at least one retaining pin 60. In certain embodiments, the slot 58 may be disposed in one or each of the at least one side 44 of the actuating member 24, and the retaining pin 60 may be disposed in the middle portion 22 of the body 12 as shown in FIG. 3. In addition or in the alternative, as shown in FIG. 3, the slot 58 may be disposed in the middle portion 22 of the body 12 such as the opposing sides 38, and the pin 60 may be disposed in one or each of the at least one side 44 of the actuating member 24. In various embodiments, at least one the actuating member 24 may be slidingly engaged with at least one of the pair of opposing sides 38 of the middle portion 22 of the body 12. For example, at least one side 44 of the actuating member 24 may slide along at least one of the opposing sides of the body 12. This movement may be restricted by the at least one stop feature 52.

As shown in FIGS. 1 and 2, at least one spring 62 may be disposed between the middle portion 22 of the body 12 and the top 42 of the actuating member 24. The spring 62 may include any compressible spring or flexible structure that provides a separating or opposing force between the middle portion 22 of the body 12 and the top 42 of the actuating member 24. For example, but not limiting of, the spring 62 may include a coil spring or a leaf spring. In general, when the spring 62 is in a resting position, such as a relaxed or in a slightly compressed state, the top 42 of the actuating member 24 is radially spaced from the middle portion 22 of the body 12.

As shown in FIG. 5, one or more extension arms 64 provide separation between the retaining feature 46 and the side 44 of the actuating member 24. The retaining feature 46 extends generally radially outward from the one or more extension arms 64. The retaining feature 46 and the extension arms 64 travel with the side 44 as the actuating member 24 is engaged. The retaining feature 46 may generally contour to the second portion 20 of the body 12. For example, the retaining feature 46 may be generally arcuate as shown. In the alternative, the retaining feature 46 may be may be generally planer or may be a combination of arcuate and planer.

When assembled to the fitting 10 body 12, as shown in FIGS. 1 and 2, the retaining feature 46 may be substantially aligned with the first slot 40. When the spring 62 is in a resting or relaxed state, the retaining feature 46 extends radially above the first slot 40. When a force is applied to the top 42 of the actuating member 24, the spring 62 is compressed and the retaining feature 46 recesses at least partially into the first slot 40.

Figure 6:
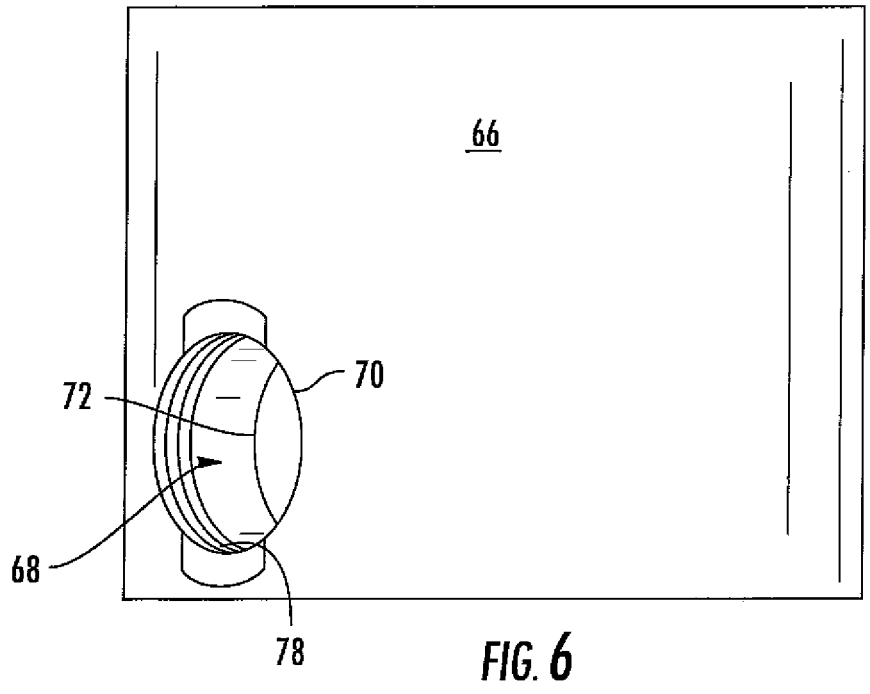
FIG. 6 illustrates a front view of a receiver body according to at least one embodiment of the present disclosure.
Figure 7:
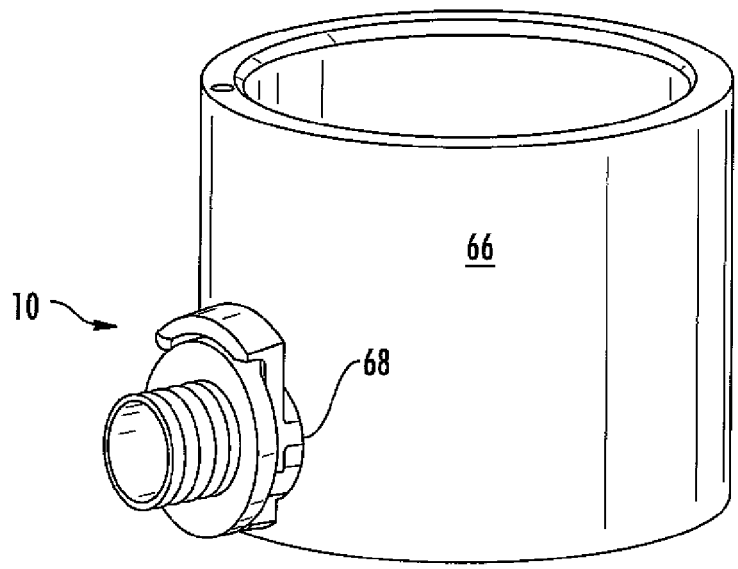
FIG. 7 illustrates a perspective view of the male fitting coupled into the receiver body according to at least one embodiment of the present disclosure.
Figure 8:
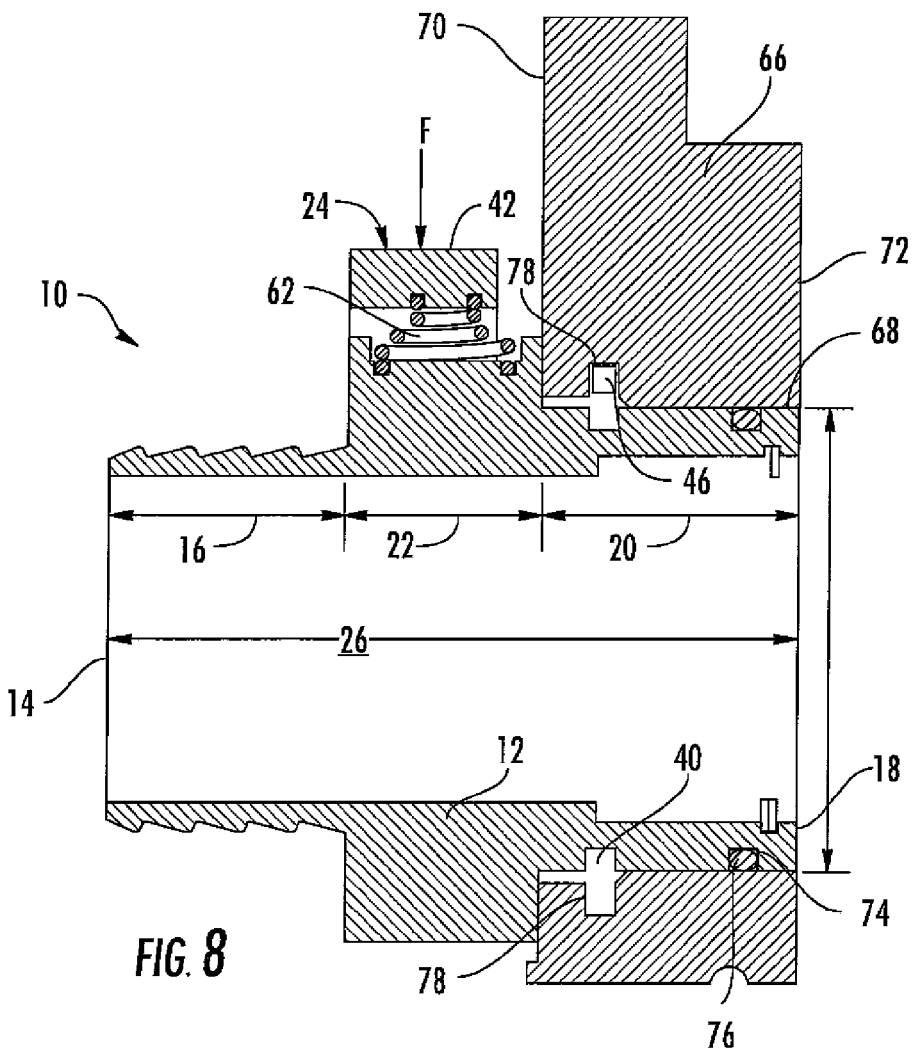
FIG. 8 illustrates a cross section side view of the male fitting and the receiver body as shown in FIG. 7, according to at least one embodiment of the present disclosure.

FIG. 6 illustrates a front view of a receiver body 66 having an opening 70, FIG. 7 provides a perspective view of the fitting 10 seated in the receiver body 66, and FIG. 8 provides a cross section view of the fitting 10 and the receiver body 66 according to at least one embodiment of the present disclosure. The receiver body 66 may include, for example, a bioreactor, a container, a vessel, a tank, a female fitting or a bulkhead. In particular embodiments, as shown in FIG. 8, the second portion 20 of the body 12 may be configured to sealingly engage with the opening 68 of the receiver body 66. As shown in FIGS. 6 and 8, the opening 68 of the receiver body 62 may generally extend from an outer wall 70 to an inner wall 72 of the receiver body 66. The opening 68 may be any shape so as to complement the second portion 20 of the body 12 of the male fitting 10. The opening 64 may be slightly larger than the second portion 20 of the body 12.

As shown in FIGS. 2, 3 and 8, the second portion 20 may include a second slot 74 that extends circumferentially around the second portion 20 of the body 12 generally adjacent to the second end 18. As shown in FIGS. 2 and 8, a radial seal 76 such as an O-ring may be disposed in the second slot 74. As shown in FIG. 8, the radial seal 76 may be compressed when the second portion 20 of the fitting 10 is inserted into the opening 68 of the receiver body 66, thereby forming a seal between the second portion 20 of the body 12 and the opening 68 of the receiver body 66. The second portion 20 may include multiple slots 74 so as to accommodate more than one radial seal 76 along the second portion 20.

In particular embodiments, as shown in FIGS. 6 and 8, a retaining slot 78 extends generally radially within the opening 68 of the receiver body 66. In operation, as shown in FIG. 8, a force F is applied to the top 42 of the actuating member 24 so as to press the top 42 towards the body 12 of the male fitting 10, thereby compressing the spring 62 and causing the retaining feature 46 to recess at least partially into the first slot 40. The second portion 20 of the body 12 may be at least partially inserted into the opening 68 of the receiver body 12 such that the retaining feature 46 of the actuating member 24 and the retaining slot 78 of the receiver body 66 are generally aligned axially and/or radially, as shown in FIG. 8.

The actuating member 24 may be released, thereby allowing the retaining feature 46 of the male fitting 10 to extend radially and/or axially into the retaining slot 78 of the receiver body 66. As a result, the male fitting 10 may be held in position until the actuating member 24 is compressed, thereby providing clearance between the retaining slot 78 and the retaining feature 46 so that the male fitting 10 may be removed from the receiver body 66.

Various technical and commercial benefits may result from the various embodiments disclosed and illustrated in FIGS. 1 through 8. For example, by eliminating the need to thread the receiver body 66 the potential for cracking and/or premature failure of the receiver body 66 may be reduced, thereby reducing the costs associated with the repair and/or replacement of the containers. In addition, by eliminating the need to wrap threads of a conventional male fitting with a thread tape, the opportunity for contamination and leakage around the threads may be significantly reduced. In addition, the quick connect and disconnect operation of the actuating member 24 of the male fitting 10 significantly decreases the time currently required to attach or switch out current male fittings. Finally, the reduction of the footprint required to accommodate the disclosed fitting 10 may allow for a more efficient use of otherwise limited space within various space-limited environments such as a test oven, a well drilling apparatus, an automobile, an aircraft, or an environmentally controlled apparatus.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A male fitting, comprising:
   a. a body that defines a fluid passage that extends through the body from a first end to a second end, the body having first portion adjacent to the first end, a second portion adjacent to the second end and a middle portion that separates the first and second portions, the second portion defining a male end of the male fitting, the body further defining a first slot between the middle portion and the second end, wherein the first slot extends at least partially circumferentially around the body;
   b. an actuating member that extends at least partially around the body, the actuating member having at least one stop feature that engages with the body and a retaining feature aligned with the first slot; and
   c. a spring disposed between the body and the actuating member, wherein the spring exerts a force on the actuating member so as to position the retaining feature radially outward from the first slot.

2. The male fitting as in claim 1, wherein the spring is one of a coil spring or a leaf spring.

3. The male fitting as in claim 1, wherein the body at least partially defines an insert opening.

4. The male fitting as in claim 1, further comprising an insert disposed within the fluid passage of the body.

5. The male fitting as in claim 1, wherein the body defines a groove disposed within the fluid passage and a retaining member inserted into the groove.

6. The male fitting as in claim 4, wherein the insert comprises of at least one of a butterfly valve, a ball valve, a check valve, a fluid filter, a flow restrictor or measurement device.

7. The male fitting as in claim 1, wherein the body defines a second slot that extends circumferentially around the second portion.

8. The male fitting as in claim 7, further comprising a radial seal disposed in the second slot.

9. The male fitting as in claim 1, wherein the body is formed by at least one of casting, molding or machining.

10. The male fitting as in claim 1, wherein the body at least partially defines one or more surface features disposed along the first portion.

11. A coupling system, comprising:
   a. a receiver body having an opening that extends through an outer wall and an inner wall of the receiver body, the receiver body further having a retaining slot proximate to the opening;
   b. a male fitting having a body that defines a fluid passage that extends through the body from a first end to a second end, the body having first portion adjacent to the first end, a second portion adjacent to the second end and a middle portion that separates the first and second portions, the second portion defining a male end of the male fitting, the body further defining a first slot between the middle portion and the second end, wherein the first slot extends at least partially circumferentially around the body, wherein the second portion is complementary to the receiver body opening;
   c. an actuating member that extends at least partially around the body, the actuating member having at least one stop feature that engages with the body, and a retaining feature substantially aligned with the first slot;
   d. a spring disposed between the body and the actuating member, wherein the spring exerts a force on the actuating member so as to position the retaining feature radially outward from the first slot; and
   e. wherein the second portion of the male fitting is disposed at least partially within the opening of the receiver body, and the retaining feature extends at least partially into the retaining slot of the receiver body.

12. The coupling system as in claim 11, wherein the spring is one of a coil spring or a leaf spring.

13. The coupling system as in claim 11, wherein the body at least partially defines an insert opening.

14. The coupling system as in claim 11, further comprising an insert disposed within the fluid passage of the body.

15. The coupling system as in claim 14, wherein the insert comprises of at least one of a butterfly valve, a ball valve, a check valve, a fluid filter, a flow restrictor or measurement device.

16. The coupling system as in claim 11, wherein the body defines a second slot that extends circumferentially around the second portion.

17. The coupling system as in claim 16, further comprising a radial seal disposed in the second slot.

18. The coupling system as in claim 11, wherein the body is formed by at least one of casting, molding or machining.

19. The coupling system as in claim 11, wherein the body at least partially defines one or more surface features disposed along the first portion.

20. The coupling system as in claim 11, wherein the receiver body comprises of one of a bioreactor, a container, a vessel, a tank, a female fitting or a bulkhead.

* * * * *

UNITED STATES PATENT AND TRADEMARK OFFICE
CERTIFICATE OF CORRECTION

| | | |
|---|---|---|
| PATENT NO. | : 8,840,150 B2 | Page 1 of 1 |
| APPLICATION NO. | : 13/926266 | |
| DATED | : September 23, 2014 | |
| INVENTOR(S) | : Sierad et al. | |

It is certified that error appears in the above-identified patent and that said Letters Patent is hereby corrected as shown below:

In the specification

Column 1, please insert after line 10 and before "BACKGROUND OF THE INVENTION," the following:

-- This invention was made with government support under grant #HL093399 awarded by The National Institutes of Health. The government has certain rights in the invention. --

Signed and Sealed this
Twenty-sixth Day of April, 2016

Michelle K. Lee
*Director of the United States Patent and Trademark Office*